United States Patent Office
2,872,436
Patented Feb. 3, 1959

2,872,436

HIGH MOLECULAR WEIGHT VINYLAROMATIC HYDROCARBON MALEIC ANHYDRIDE COPOLYMERS AND PROCESS FOR THEIR PREPARATION

Billy B. Hibbard, Midland, Mich., assignor to The Dow Chemical Company, Midland, Mich., a corporation of Delaware No Drawing. Application May 11, 1956
Serial No. 584,165

4 Claims. (Cl. 260—78.5)

This invention relates to a process for preparing a high molecular weight vinylaromatic hydrocarbon-maleic anhydride copolymer, particularly useful as a soil conditioner, and to the products of such process.

Vinylaromatic hydrocarbon-maleic anhydride copolymers of many sorts are well known. They have varied from low to intermediate molecular weight products ranging up to a maximum of about 235,000 weight average molecular weight.

In accordance with this invention it has been discovered that an extremely high molecular weight maleic anhydride copolymer of a styrene of the group consisting of styrene and methylstyrenes such as vinyltoluene and vinylxylene or mixtures of any two or more such styrenes, ranging from about 700,000 to 5,500,000 or greater weight average molecular weight, can be prepared by reacting a mixture of approximately equimolar proportions of such a styrene and maleic anhydride, in solution in methylene chloride, within the temperature range of from about 35° to 45° C., in the presence of a catalytic amount of an organic peroxide catalyst.

Solutions of the reactants in methylene chloride varying from about 0.5 to about 33 percent and preferably from about 4 to 6 percent concentration are advantageously used. Below 0.5 percent reactants concentration, the process is uneconomic. Between about 10 and 33 percent reactants concentration, the copolymer which is produced is somewhat more difficult to handle, in that a thicker slurry is formed. A reactants concentration of from about 4 to 6 percent is most advantageously processed.

The use of methylene chloride as reaction medium is critical. It was most surprising to find that such a high molecular weight styrene-maleic anhydride copolymer could be prepared in the presence of methylene chloride, since chlorinated hydrocarbons are well known as telomers or chain terminators. Surprisingly, carbon tetrachloride, chloroform, methylene bromide, ethylene dichloride, acetone, toluene, xylene, and the like are not operable in place of methylene chloride to give an equivalent result.

Styrenes of the class consisting of styrene, vinyltoluene and vinylxylene are operable in this invention. The styrene and maleic anhydride can be employed in any desired proportions, but for convenience are preferably employed in approximately equimolar proportions.

The temperature of the reaction is relatively critical, ranging from about 35° to 45° C. and, preferably, about 40° to 41° C. Higher polymerization temperatures than 45° C. give low molecular weight products, while lower temperatures than 35° C. require an uneconomic expenditure of time.

A catalytic amount of an organic peroxide catalyst such as lauroyl peroxide, benzoyl peroxide, and diacetylperoxide can be used in making these high molecular weight copolymers. Proportions of catalyst ranging from about 0.01 to 6 and preferably from about 0.15 to 1.2 weight percent of monomers are advantageously used. The reaction time may vary from several hours to 24 hours or longer, depending in part upon the catalyst concentration.

In practice, the reactants are dissolved in the methylene chloride in the desired proportions. A catalytic amount of an organic peroxide catalyst is added. The mixture is usually agitated and maintained at reaction temperatures of from about 35° to 45° C. As the reaction proceeds, the copolymer precipitates from the solution. Upon completion of the reaction, the slurry can be treated with an alkali, e. g., an aqueous solution of sodium hydroxide, to form a salt of the copolymer. The copolymer is recovered in usual ways, e. g., by filtering or centrifuging.

In accordance with the process of this invention, copolymers are obtained which have a weight average molecular weight range of from about 700,000 to 5,500,000 or greater. A method of determining weight average molecular weights of polymers is described in J. Phys. and Coll. Chem. 51, p. 18, 1947. A 0.5% aqueous solution of the sodium salt of a high molecular weight styrene-maleic anhydride copolymer has a pH range of about 7 to 9.5 and a Brookfield viscosity between about 150 centipoises and up to about 4100 centipoises at 25° C. The alkali salts of the copolymers are useful as soil conditioners because of their ability to improve the physical structure of soils.

The following examples represent preferred embodiments of this invention. Parts and percentages therein are by weight.

EXAMPLE 1

A charge of 40.0 parts of styrene and 37.5 parts of maleic anhydride was dissolved in 1422.5 parts of methylene chloride and brought to reflux temperature, 40° to 41° C. Thereafter, 0.0235 part of lauroyl peroxide was added. After refluxing for about 22 hours, the thick slurry which formed was filtered and the product was recovered. The dried copolymer product was obtained in a yield of 86.5 percent as a white powder having a weight average molecular weight of 2,158,000 as measured by light scattering techniques.

EXAMPLE 2

A charge of 40.0 parts of styrene and 37.5 parts of maleic anhydride was dissolved in 1422.5 parts of methylene chloride. The solution was brought to reflux temperature and 0.93 part of lauroyl peroxide was then added. After refluxing for about 22 hours, the thick slurry which formed was filtered, and the product was recovered. The dried yield was 96.8 percent copolymer on the basis of starting materials. The copolymer had a weight average molecular weight of 2,400,000.

EXAMPLE 3

A charge of 40 parts of styrene and 37.5 parts of maleic anhydride was dissolved in 1422 parts of methylene chloride. The solution was brought to reflux temperature and 0.465 part of lauroyl peroxide was then added. After refluxing for about 22 hours, the thick slurry which formed was filtered and the product recovered. The dried yield was 90.5 percent copolymer on the basis of starting materials. The weight average molecular weight of this material as determined by light scattering techniques was 5,500,000.

EXAMPLE 4

A charge of 49.4 parts of vinyltoluene and 37.5 parts of maleic anhydride was dissolved in 1425 parts of methylene chloride. The solution was brought to reflux temperature and one part of lauroyl peroxide was then added. After refluxing for about 22 hours, the copolymer product was recovered as a rubbery mass somewhat difficult to dry, but representing an approximately theoretical yield on the basis of the starting materials. A small portion was carefully dried and found to have a weight average molecular weight of 3,200,000 as determined by light scattering techniques.

EXAMPLE 5

A charge of 21.1 parts of vinyltoluene, 19.2 parts styrene and 36.2 parts of maleic anhydride was dissolved in 1422 parts of methylene chloride. The solution was brought to reflux temperature and 0.465 part of lauroyl peroxide catalyst was then added. After refluxing for 21.8 hours, the product was recovered in a 90.7 percent yield as a mass having a physical appearance intermediate that of the product of Example 4 and the product of Example 2, and having a weight average molecular weight of 3,100,000. Combined styrene to vinyltoluene to maleic anhydride in such terpolymer was in the molar ratio of about 0.5 to 0.5 to 1.

EXAMPLE 6

A quantity of 2424 pounds of methylene chloride was pumped into a reactor, 58.8 pounds of maleic anhydride was added slowly thereto and the mixture was stirred for about one hour. Then 62.4 pounds of styrene was added to the reaction mixture and stirred for about fifteen minutes, at which time 0.72 pound of lauroyl peroxide was added. The reaction mixture was then brought to a reflux temperature of about 40° to 41° C. and held at reflux for 22 hours. An aliquot of the resulting slurry was withdrawn and dried. The weight average molecular weight of the dried copolymer was determined by light scattering techniques to be 1,250,000. The remainder of the copolymer, obtained in 90 percent yield, was neutralized with 50 percent caustic in slurry form, filtered and dried, to give a dried product which, as a 2 percent aqueous solution, had a pH value of 8.25.

The following table illustrates the value of the products of this invention as soil conditioners, in comparison with an untreated soil (control) and with a neutralized styrene-maleic anhydride copolymer, one of the group having the highest molecular weight presently commercially available.

*Table I*

| Sample | Conc. of polymer, percent | Percolation, cc./hr. | Percent water-stable aggregates | Water retention | Column height, inches |
| --- | --- | --- | --- | --- | --- |
| No soil treatment (Control) | none | 40 | 14 | 32 | 4.75 |
| Commercial sample of styrene-maleic anhydride copolymer | 0.05 | 650 | 60 | 35 | 5.37 |
| Sample of Example 1 | 0.05 | 1,046 | 61 | 40 | 5.87 |
| Sample of Example 6 | 0.05 | 2,750 | 64 | 30 | 5.62 |

The test procedures used are as follows:

*Percolation rate.*—The equipment consists of a brass tube, 10 inches long by 1⅞ inches in diameter (inside) with a cast brass base, corrugated on its upper surface and soldered into the bottom (Cenco 28315). On the lower surface of the casting is a nipple for rubber tubing connection. A loose brass disc with small, round perforations fits over the top of the corrugations in the casting, allowing free passage of air or water through the tube. A small brass tube is soldered to the outside near the top, with an opening into the soil tube. This construction permits connection of a series of tubes so that a constant water head can be maintained.

A quantity of air-dried Miami silt loam soil is sieved through a 10-mesh screen. A 300 gram portion is used for each tube. The test material is made up to the desired concentration in water and a 25 ml. volume of solution is added to the soil. The samples are then placed in the soil tubes, wetted to saturation and allowed to stand for 72 hours. The tubes are maintained under a constant head and the total volume of water that passes through the soil during a given time interval is measured. This interval is broken into three successive daily runs of 7 to 8 hours each. The results, reported as percolation rate in cc. per hour, are calculated by dividing the total volume of effluent by the total number of hours.

*Weight of water stable aggregates.*—The percolation is terminated and the tubes are allowed to drain for 16 hours. The soil column is then slipped out of the tube and a 200 gram (wet weight) longitudinal sample is taken. The sample is placed on a double screen (14 mesh, 32 mesh) and agitated in a tank of water until all of the non-aggregated fines passing 32 mesh are screened out. These water stable aggregates range from 0.5 mm. to 5 mm. in size. The aggregates are weighed after draining five minutes on the screen.

*Water retention.*—The weight of the soil column is determined immediately after draining 16 hours. As indicated under "Percolation rate" above, the column was prepared originally with 300 grams of dry soil, and the added weight represents the water held after normal gravity draining.

*Compaction.*—The height of the soil column is determined while the soil is still in the percolation tubes. This figure indicates the packing or settling of the soil during the percolation experiments.

What is claimed is:

1. A process for making a high molecular weight copolymer of maleic anhydride and at least one styrene selected from the group consisting of styrene, vinyltoluene, and vinylxylene, which process comprises polymerizing a mixture of approximately equimolecular proportions of the reactants at temperatures between 35° and 45° C. while in admixture with methylene chloride in amount sufficient to form a solution of the monomers in concentrations between 0.5 and 33 percent and in the presence of a catalytic amount of an organic peroxide until a copolymer having a weight average molecular weight of at least 700,000 is obtained, as determined by the light scattering method.

2. A process as claimed in claim 1 in which the percentage of reactant monomers in solution is from about 4 to 6 percent.

3. A process as claimed in claim 1 in which the reaction temperature ranges from about 40° to 41° C.

4. A copolymer of substantially equimolar proportions of maleic anhydride and at least one styrene selected from the group consisting of styrene, vinyltoluene and vinylxylene having a weight average molecular weight of at least 700,000 and up to about 5,500,000, as determined by the light scattering method said copolymer containing in chemically combined form at least one group which is a member of the class consisting of maleic anhydride, maleic acid, and alkali metal salts thereof prepared by the process of claim 1.

References Cited in the file of this patent

UNITED STATES PATENTS

| | | |
| --- | --- | --- |
| 2,297,351 | Gerhart | Sept. 29, 1942 |
| 2,333,513 | Berberich et al. | Nov. 2, 1943 |
| 2,634,256 | Sparks et al. | Apr. 7, 1953 |
| 2,675,370 | Barrett | Apr. 13, 1954 |

OTHER REFERENCES

Debye: "J. Phys. and Coll. Chem.," vol. 5 (1947), pp. 18–31.

Schildknecht: Vinyl and Related Polymers, Wiley & Sons (1952), pp. 65–68.